(12) United States Patent
Iino

(10) Patent No.: US 6,900,864 B2
(45) Date of Patent: May 31, 2005

(54) TRANSFLECTIVE ELECTRO-OPTICAL DEVICE AND ELECTRONIC APPARATUS

(75) Inventor: Shoichi Iino, Nirasaki (JP)

(73) Assignee: Seiko Epson Corporation, Tokyo (JP)

( * ) Notice: Subject to any disclaimer, the term of this patent is extended or adjusted under 35 U.S.C. 154(b) by 205 days.

(21) Appl. No.: 10/162,682

(22) Filed: Jun. 6, 2002

(65) Prior Publication Data

US 2003/0001994 A1 Jan. 2, 2003

(30) Foreign Application Priority Data

Jun. 7, 2001 (JP) ........................................ 2001-173108

(51) Int. Cl.⁷ ............................................ G02F 1/1335
(52) U.S. Cl. ........................ 349/115; 349/106; 349/108; 349/113
(58) Field of Search ................................ 349/113, 114, 349/115, 106, 108, 110

(56) References Cited

U.S. PATENT DOCUMENTS

| | | | |
|---|---|---|---|
| 4,630,894 A | 12/1986 | Cremers | |
| 5,729,313 A | * 3/1998 | Mitsui | ........................ 349/106 |
| 5,822,029 A | * 10/1998 | Davis et al. | ................. 349/115 |
| 6,038,054 A | * 3/2000 | Sakai et al. | .................. 359/253 |
| 6,211,992 B1 | 4/2001 | Van Aerle et al. | |
| 2002/0113927 A1 | 8/2002 | Ha et al. | |
| 2002/0145688 A1 | * 10/2002 | Sekiguchi | ................... 349/114 |

FOREIGN PATENT DOCUMENTS

| | | |
|---|---|---|
| JP | A 8-304626 | 11/1996 |
| JP | A 9-146088 | 6/1997 |
| JP | A-11-52366 | 2/1999 |
| JP | A-2000-231097 | 8/2000 |
| JP | A 2000-231097 | 8/2000 |

* cited by examiner

Primary Examiner—Tarifur R. Chowdhury
Assistant Examiner—Michael H Caley
(74) Attorney, Agent, or Firm—Oliff & Berridge, PLC

(57) ABSTRACT

In an electro-optical device, such as a transflective liquid crystal device, color transmissive display having normal color tones is performed, and in addition, bright, color reflection display is also performed. The electro-optical device in accordance with the invention includes an electro-optical material provided between a first substrate and a second substrate, and display electrodes provided above the first substrate so as to be opposed to the second substrate. The electro-optical device further includes a first color filter having a selective-reflection region in each pixel that selectively reflects light in a predetermined wavelength range, and a light transmission region in each pixel that transmits light outside of the predetermined wavelength range; a light-shielding film provided so as to be opposed to the selective-reflection regions; and a second color filter having a selective-transmission region in each pixel that selectively transmits light in the predetermined wavelength range.

17 Claims, 11 Drawing Sheets (a)

(b)

(c)

TRANSFLECTIVE ELECTRO-OPTICAL DEVICE AND ELECTRONIC APPARATUS

BACKGROUND OF THE INVENTION

1. Field of Invention

The present invention relates to transflective electro-optical devices which can interchangeably perform reflective display by using external light and transmissive display via light-source light. The invention also relates to an electronic apparatus provided with such a device.

2. Description of Related Art

In a transflective electro-optical device, such as a transflective liquid crystal display device, reflective display is performed in a bright place by using external light while a light source is turned off. In a dark place, transmissive display is performed by using light emitted from the light source that is turned on. In particular, reflective display is performed by having incident external light reflected off of areas of a transflective film other than slits provided therein, which are used for light transmission, to the exterior of the device via an electro-optical material layer formed of liquid crystals or the like. On the other hand, transmissive display is performed by transmitting light emitted from a light source provided at a back side of a transflective film, and by emitting this transmitted light to the exterior of the device via the electro-optical material layer formed of liquid crystals or the like. This type of transflective electro-optical device has been widely used as a display device of a portable electronic apparatus, such as a mobile phone, since there is a strong demand for electrical power conservation, and in addition, this type of device may be optionally used in a dark place.

In addition, a color reflective electro-optical device, which performs color display by using color filters (hereinafter "selective-transmission color filter") formed of resin materials colored by dyes or pigments, has also been developed. However, this type of color filter has been formed so that each pixel selectively transmits light in a predetermined wavelength range and selectively absorbs light outside of that range, and hence, the optical efficiency for this type of color reflective electro-optical device is basically low. Accordingly, when color reflective display is performed by this type of selective-transmission color filter using external light that only has a limited light intensity, the brightness of the display is generally decreased. Accordingly, in order to create a bright color reflective display, a method in which light in a predetermined wavelength range is not selectively transmitted but is selectively reflected has also been developed. For example, in Japanese Unexamined Patent Application Publication Nos. 8-304626, 9-146088, and 2000-231097, cholesteric liquid crystal and a color filter (hereinafter "selective-reflection color filter") which selectively reflects light in a predetermined wavelength range by using a polymer film or the like have been disclosed. According to the techniques disclosed in these publications, by increasing the optical efficiency of external light, a bright, color reflective display can be created.

When the selective-reflection color filter described above is applied to the transflective electro-optical devices, a bright reflective display can be created. However, when transmissive display is performed, light-source light which is selectively transmitted through the selective-reflection color filter, that is, light with a color complementary with respect to the color of light that is selectively reflected, is transmitted through the selective-reflection color filter as light-source light, and then the light is emitted to the exterior of the device. That is, when transmissive display is performed, a display in colors, that are complementary to those of a reflective display, is created. Accordingly, when a display device is formed so that the color tones are normally displayed in color reflective display, a problem may arise in that the color tones are abnormally displayed in color transmissive display.

As a result, according to any of the techniques described above, there has been a problem, which is difficult to address or solve, in that a color display having normal color tones and a bright, color reflective display cannot be compatible with each other in a transflective electro-optical device.

SUMMARY OF THE INVENTION

The present invention addresses the problems discussed above, and provides a transflective electro-optical device which can create a color transmissive display having normal color tones and a bright, color reflective display. The invention also provides an electronic apparatus provided with this transflective electro-optical device.

Thus, a transflective electro-optical device of the present invention includes an electro-optical material provided between a pair of substrates; display electrodes provided on at least one of the pair of substrates at an electro-optical material side; a first color filter provided on one substrate of the pair of substrates at the electro-optical material side, the first color filter having a selective-reflection region in each pixel that selectively reflects light in a predetermined wavelength range and a light-transmission region in each pixel that transmits light outside of the predetermined wavelength range; a light-shielding film provided at an opposite side of the first color filter from the electro-optical material so as to be opposed to the selective-reflection regions; a second color filter provided at the opposite side of the first color filter from the electro-optical material so as to be opposed to the light-transmission regions, the second color filter having a selective-transmission region in each pixel that selectively transmits light in the predetermined wavelength range; and a light-source provided at the opposite side of the second color filter from the electro-optical material. The other one substrate of the pair of substrates that is opposed to the first color filter, with the electro-optical material provided therebetween, is a transparent substrate.

According to the transflective electro-optical device of the present invention, where reflective display is performed in a bright place, the light-source is placed in an OFF state, that is, a state in which light-source light is not emitted. In this state, after passing through the electro-optical material, external light that is incident on the transparent substrate is reflected off of the selective-reflection regions of the first color filter, and is then emitted from the transparent substrate side. In the step described above, in the first color filter, light in the predetermined wavelength range, such as R (red), G (green), or B (blue), is selectively reflected in each pixel. The first color filter described above is formed of cholesteric liquid crystal, a hologram, a dychroic mirror, or the like, which are commonly known. Accordingly, for example, where a polarizer is provided on the transparent substrate, and where an electro-optical material, such as liquid crystal, is driven by display electrodes provided for the substrate, reflective display exhibiting a plurality of colors, such as RGB colors, can be performed on the transparent substrate side used as a display screen by using external light.

On the other hand, where transmissive display is performed in a dark place, the light-source is placed in an ON state, that is, a state in which light-source light is emitted. In this state, after light-source light that is emitted form the light-source passes through the selective-transmission regions of the second color filter and, almost at the same time, passes through areas at which the light-shielding film is not provided, the light-source light further passes through the light-transmission regions of the first color filter, and is then emitted from the transparent substrate side through an electro-optical material. In the step described above, in the second color filter, light in the predetermined wavelength range, such as R, G, or B, is selectively transmitted in each pixel. The second color filter described above is formed of known color filters in which resin materials are colored by dyes or pigments. Accordingly, for example, where a polarizer is provided on each substrate, and where an electro-optical material, such as liquid crystal, is driven by display electrodes provided for the substrate, transmissive display exhibiting a plurality of colors, such as RGB colors, can be performed on the transparent substrate side used as a display screen by using light-source light.

Next, a case is discussed in which color display is also performed by using the first color filter when transmissive display is performed, that is, the case in which the second color filter, the light-shielding film, and the light-transmission regions of the first color filter, described in the present invention, are not provided. Since light-source light selectively transmitted through the first color filter is emitted from the transparent substrate side, where transmissive display is performed, colors in complementary relationships with those of a reflective display are displayed in corresponding pixels, respectively. On the other hand, in the present invention, since the second color filter and the light-shielding film are provided, and in addition, the light transmission regions are formed in the first color filter, where transmissive display is performed, light transmitted through the second color filter is transmitted through the light-transmission regions of the first color filter without being affected, and is then emitted from the transparent substrate side, and hence, colors complementary to those of a reflective display are not displayed in the corresponding pixels, respectively.

The display electrodes used in the present invention are provided for one substrate of a pair of substrates, or for both substrates, in accordance with a drive system. For example, where a passive matrix drive is used, electrodes in a stripe pattern are provided for both substrates so as to intersect and face each other. Where a TFD (Thin Film Diode) active matrix drive is used, pixel electrodes forming an island-shaped pattern are provided for one substrate, and electrodes in a stripe pattern are provided for the other substrate so as to be opposed to each other. Where a TFT (Thin Film Transistor) active matrix drive is used, pixel electrodes forming an island-shaped pattern are provided for one substrate, and a counter electrode is provided on the entire surface of the other substrate so as to be opposed to each other. In addition, where a TFT active matrix drive has a lateral electric field drive system, pixel electrodes forming an island-shaped pattern in a matrix are provided for one substrate of the pair of substrate. In addition, there may be various methods to dispose a polarizer in accordance with arrangement of an electro-optical material, such as liquid crystal, and in addition, a retardation film for color correction may also be disposed on a polarizer.

In the structure according to the present invention described above, the other substrate opposed to the transparent substrate may be a transparent substrate. However, where the structure in which the first color filter, the light-shielding film, the second color filter, and the light-source are provided for the other substrate at the electro-optical material side is used, it is not always necessary that the other substrate be a transparent substrate.

As a result, according to the transflective electro-optical device of the present invention, by using the selective-reflection type first color filter, the optical efficiency therein is high in a bright place, and hence, a bright, color reflective display can be created. In a dark place, regardless of the presence of the first color filter, by the second color filter, a color transmissive display can be created in each pixel as with the case in which a color reflective display is created.

According to one mode of the transflective electro-optical device of the present invention, the first color filter includes a selective-reflection layer provided in the selective-reflection region in each pixel, and the selective-reflection layer is not provided in a part of the light transmission region.

According to this mode, in the selective-reflection regions of the first color filter, external light is reflected off of the selective-reflection layer formed of, for example, known cholesteric liquid crystal, a hologram, a dychroic mirror, or the like, and hence, a bright, color reflective display can be created. In contrast, since the selective-reflection layer described above is not provided in a part of the light-transmission region, light-source light passes therethrough without being affected, and hence, a bright, transmissive display, which does not exhibit colors complementary to those of a reflective display, can be created.

In this mode, the selective-reflection layer may be provided with an opening or a slit at a position corresponding to the light-transmission region.

Where the structure is formed as described above, by regularly or irregularly forming one or more than one openings or slits in each pixel, the light-transmission region can be reliably and relatively easily formed.

In addition, in the mode described above, neighboring selective-reflection layers may form spacings therebetween so that the spacings are used as the light-transmission regions.

Where the structure is formed as described above, by forming selective-reflection layers each having the periphery slightly smaller than the periphery of an opening region (a region where light to be used for a display is reflected or transmitted) of the pixel, the spacings between the selective-reflection layers can be reliably and relatively easily formed as the light-transmission regions.

In accordance with another mode of the transflective electro-optical device of the present invention, the display electrodes include first transparent electrodes in a stripe pattern provided on the first color filter at the electro-optical material side; and second transparent electrodes in a stripe pattern which are provided to be opposed to the first transparent electrodes, with the electro-optical material interposed therebetween, and to intersect the first transparent electrodes.

According to this mode described above, on the first color filter at the electro-optical material side, the first transparent electrodes in a stripe pattern formed of, for example, an ITO (Indium Tin Oxide) film, are formed. In contrast, the second transparent electrodes in a stripe pattern formed of, for example, an ITO film, are provided so as to be opposed to the first transparent electrodes with the electro-optical material interposed therebetween. That is, in the case described above, the first transparent electrodes are provided for the substrate provided with the light-source, and the second transparent electrodes are provided for the transparent substrate on which external light is incident. Accordingly, a transflective electro-optical device having a passive matrix drive system can be realized.

In addition, in accordance with another mode of the transflective electro-optical device of the present invention, the display electrodes include first transparent electrodes forming an island-shaped pattern which are provided on the first color filter at the electro-optical material side, and which are each provided in each pixel; and a second transparent electrode provided to be opposed to the first transparent electrodes with the electro-optical material interposed therebetween.

According to the mode described above, on the first color filter at the electro-optical material side, the first transparent electrodes forming an island-shaped pattern formed of, for example, an ITO film, that is, the pixel electrodes, are formed. In contrast, the transparent electrode formed of, for example, an ITO film, that is, the counter electrode formed over the entire surface of the substrate or counter electrodes in a stripe pattern, is provided so as to be opposed to the first transparent electrodes with the electro-optical material interposed therebetween. That is, in the case described above, the pixel electrodes are provided for the substrate provided with the light source, and the counter electrode is provided for the transparent substrate on which external light is incident. Accordingly, an active matrix drive system can be realized.

In accordance with another mode of the transflective electro-optical device of the present invention, the display electrodes include first transparent electrodes forming an island-shaped pattern which are provided to be opposed to the first color filter with the electro-optical material interposed therebetween, and which are each provided in each pixel; and a second transparent electrode provided to be opposed to the first transparent electrodes with the electro-optical material interposed therebetween.

According to the mode described above, the first transparent electrodes forming an island-shaped pattern formed of, for example, an ITO film, that is, the pixel electrodes, are provided so as to be opposed to the first color filter with the electro-optical material interposed therebetween. In contrast, the transparent electrode formed of, for example, an ITO film, that is, the counter electrode formed over the entire surface of the substrate or counter electrodes in a stripe pattern, is provided so as to be opposed to the first transparent electrodes with the electro-optical material interposed therebetween. That is, in the case described above, the pixel electrodes are provided for the transparent substrate on which external light is incident, and the counter electrode is provided for the substrate provided with the light-source. Accordingly, an active matrix drive system can be realized.

In the mode in which the display electrodes include the first transparent electrodes forming an island-shaped pattern, a switching element which is connected to the first transparent electrode may be further provided in each pixel.

According to the structure described above, by performing switching drive of the first transparent electrodes, that is, the pixel electrodes, using switching elements, such as a TFT or a TFD, an active matrix drive can be performed.

In accordance with another mode of the transflective electro-optical device of the present invention, the second color filter is provided on the one substrate of the pair of substrates at the electro-optical material side.

According to the mode described above, by the second color filter and the first color filter provided in that order on said one of the pair of substrates at the electro-optical material side, transmissive display and reflective display can both be performed.

In accordance with another mode of the transflective electro-optical device of the present invention, the second color filter is provided at the opposite side of the one substrate of the pair of substrates from the electro-optical material.

According to the mode described above, by the second color filter provided at the opposite side of the one substrate of the pair of substrates from the electro-optical material and the first color filter provided for the one substrate of the pair of substrates at the electro-optical material side, transmissive display and reflective display can both be performed.

In accordance with another mode of the transflective electro-optical device of the present invention, the light-source is provided at the opposite side of the second color filter from the electro-optical material, and includes a light guide plate provided so as to be opposed to the second color filter and a light source which emits light into the light guide plate.

According to the mode described above, where transmissive display is performed in a dark place, light-source light emitted from the light source is guided to the second filter by the light guide plate. The light-source light thus guided is selectively transmitted through the second color filter, is further transmitted through the light-transmission regions of the first color filter without being affected, and is the emitted from the transparent substrate via the electro-optical material. Accordingly, a bright, transmissive display, which does not exhibit colors complementary to those of a reflective display, can be created.

In addition, in accordance with another mode of the transflective electro-optical device of the present invention, the light-source is provided at the opposite side of the second color filter from the electro-optical material, and includes a plurality of point light sources provided so as to be opposed to the associated light transmission regions with the second color filter interposed therebetween.

According to the mode described above, where transmissive display is performed in a dark place, light-source light is emitted from the light source to the light-transmission regions of the first color filter. The light-source light is selectively transmitted through the second color filter, is further transmitted through the light-transmission regions of the first color filter without being affected, and is then emitted from the transparent substrate via the electro-optical material. Accordingly, since there is substantially no light-source light that is blocked by the light-shielding film, the energy efficiency in the light source is high, and a bright transmissive display can be created.

In accordance with another mode of the transflective electro-optical device of the present invention, the transflective electro-optical device further includes a plurality of microlenses provided at the opposite side of the first color filter from the electro-optical material so as to be opposed to the associated light transmission regions.

According to the mode described above, where transmissive display is performed in a dark place, light-source light emitted from the light source is transmitted through the second color filter and, almost at the same time, is condensed on the light-transmission regions of the first color filter by the microlenses. The light-source light is transmitted through the light-transmission regions of the first color filter without being affected and is then emitted from the transparent substrate via the electro-optical material. Accordingly, since there is only a small amount of light that is blocked by the light-shielding film, the energy efficiency in the light source is high, and a bright transmissive display can be created.

In accordance with another mode of the transflective electro-optical device of the present invention, the light-shielding film is provided between the first color filter and the second color filter.

According to the mode described above, by the light-shielding film provided between the first color filter and the second color filter, where transmissive display is performed, light-source light is prevented from being selectively transmitted through the selective-reflection regions of the first color filter, that is, the generation of light-source light which creates a color display complementary to a reflective display can be prevented. However, the light-shielding film described above may be provided in the same layer as that of the second color layer or may be provided at the opposite side of the second color filter from the first color filter.

In order to address or solve the problems described above, an electronic apparatus of the present invention includes the transflective electro-optical device (including various modes described above) described above of the present invention.

Since the electronic apparatus of the present invention includes the electro-optical device of the present invention described above, various electronic apparatuses which can perform both bright reflective display and transmissive display, such as a liquid crystal television, a mobile phone, an electronic notebook, a word processor, a viewfinder type of direct viewing video tape recorder, workstation, a television phone, a POS terminal, a touch panel, and a projection type display device, for example, can be realized.

The operation and the advantages of the present invention will be apparent by the following descriptions of the embodiments.

BRIEF DESCRIPTION OF THE DRAWINGS

FIG. 9 is a schematic plan view showing a particular example of a TFD drive element in FIG. 8 together with a pixel electrode and the like;

DETAILED DESCRIPTION OF PREFERRED EMBODIMENTS

Hereinafter, the embodiments of the present invention will be described with reference to drawings. In the embodiments described below, a transflective electro-optical device of the present invention is applied to a transflective liquid crystal device.

(First Embodiment)

Figure 1:
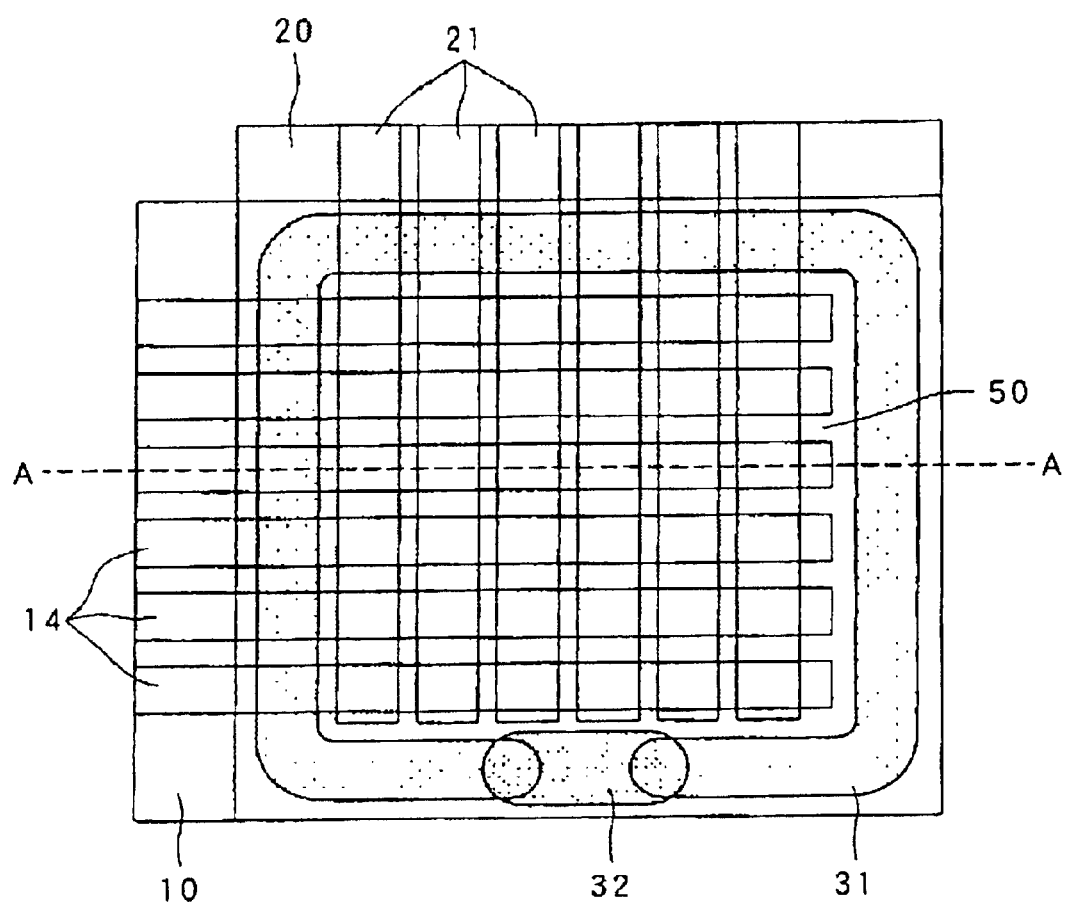
FIG. 1 is a schematic plan view of a transflective liquid crystal device having a passive matrix drive system, as viewed from a counter substrate side, according to a first embodiment of the present invention.
Figure 2:
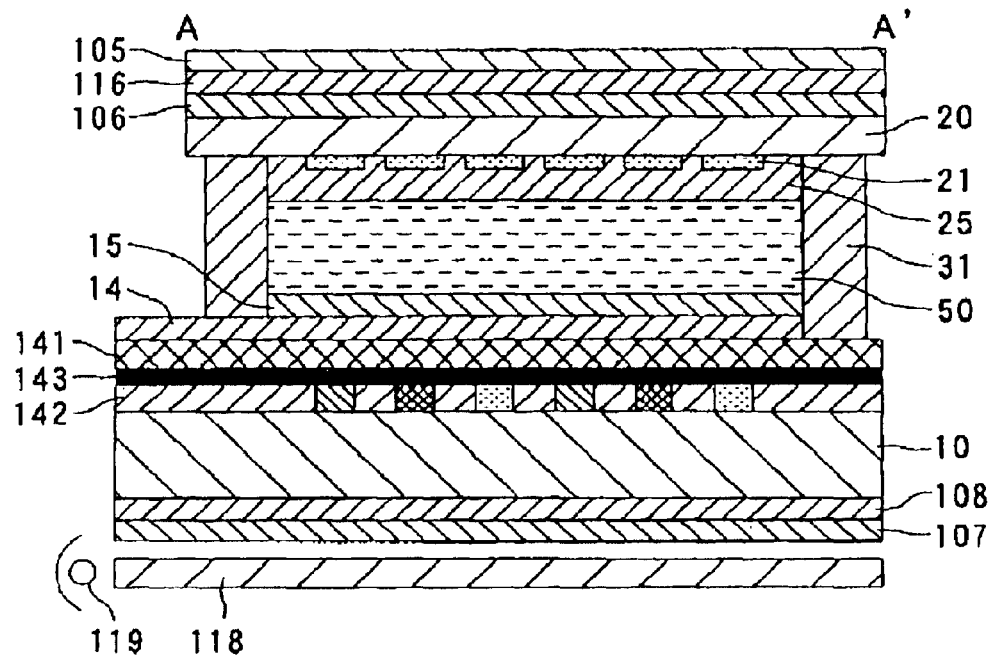
FIG. 2 is a schematic cross-sectional view of the transflective liquid crystal device including color filters taken along the plane A–A' in FIG. 1.
Figure 3:
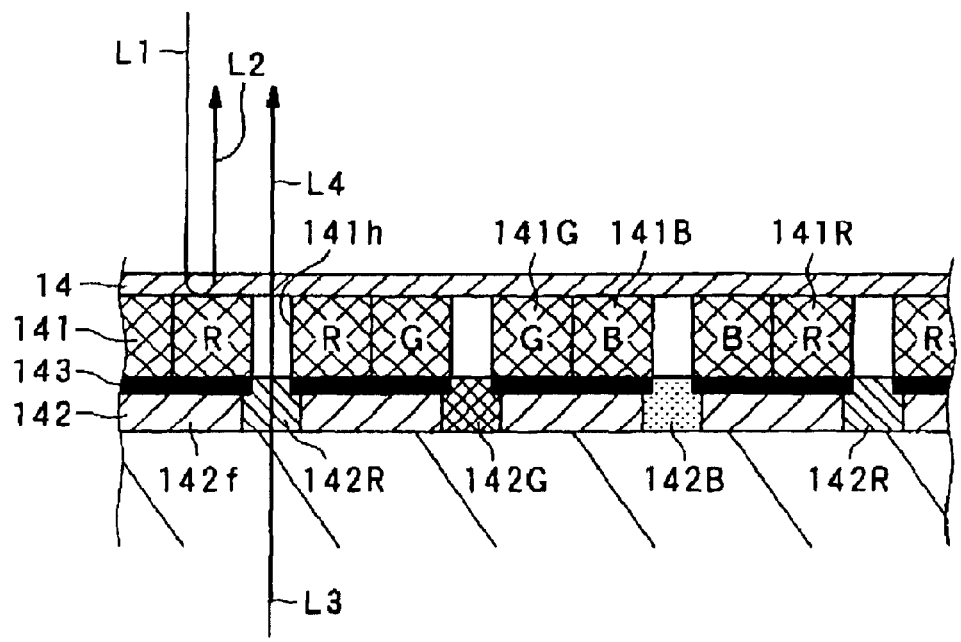
FIG. 3 is a schematic cross-sectional enlarged view of an area including a selective-reflection color filter, a selective-transmission color filter, and a light-shielding film shown in FIG. 2.
Figure 4:
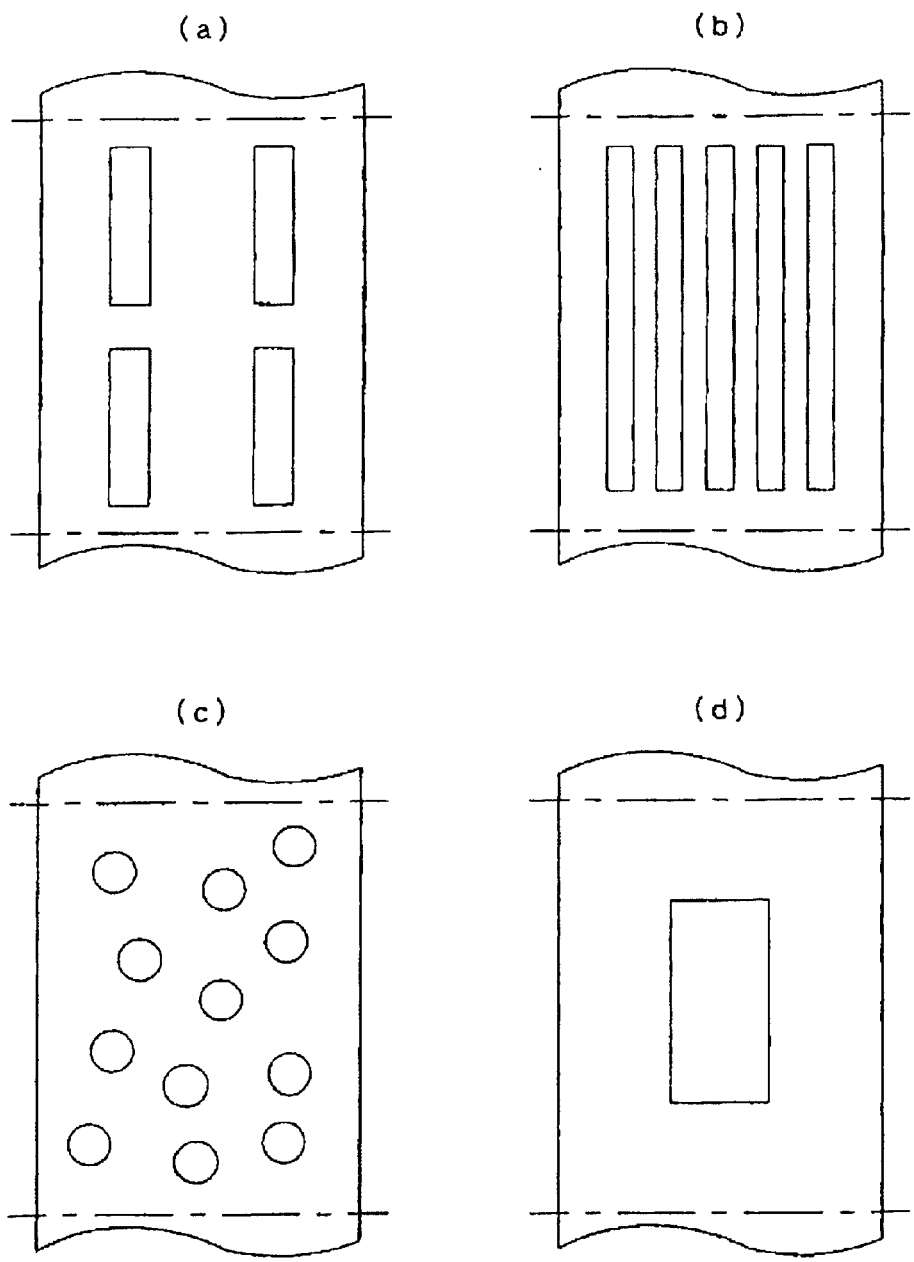
FIGS. 4(a)–4(d) are enlarged plan views showing various particular examples of slits and openings provided in the selective-reflection color filter of the first embodiment.

A first embodiment of the present invention will be described with reference to FIGS. 1 to 4. In the first embodiment, the present invention is applied to a transflective liquid crystal device having a passive matrix drive system. FIG. 1 is a schematic plan view of a transflective liquid crystal device of the first embodiment as viewed from a second substrate side, in which a color filter, a light-shielding film, and the like formed on a first substrate are not shown for the convenience of illustration in the figure; FIG. 2 is a schematic cross-sectional view of the transflective liquid crystal device, which includes the color filter, the light-shielding film, and the like, taken along plane A–A' in FIG. 1; and FIG. 3 is a schematic enlarged cross-sectional view of an area including a selective-reflection color filter, a selective-transmission color filter, and the light-shielding film shown in FIG. 2. FIG. 4 includes enlarged plan views of particular examples of slits and opening portions provided in the selective-reflection color filter. In FIG. 1, for the convenience of illustration in the figure, six electrodes in a stripe pattern are schematically shown in each longitudinal and lateral direction. However, a number of electrodes are provided in practice. In FIGS. 2 and 3, in order to recognize individual layers and individual members in these figures, the individual layers and the individual members are shown in scales that are different from each other.

In FIGS. 1 and 2, the transflective liquid crystal device of the first embodiment includes a transparent first substrate 10, a transparent second substrate 20 provided so as to be opposed to the first substrate 10, a liquid crystal layer 50 provided between the first substrate 10 and the second substrate 20, a plurality of transparent electrodes 14 in a stripe pattern provided at the first substrate 10 side so as to be opposed to the second substrate 20 (that is, at the upper side surface in FIG. 2), and an alignment layer 15 provided on the transparent electrodes 14. The transflective liquid crystal device has a plurality of transparent electrodes 21 in a stripe pattern provided on the second substrate 20 so as to be opposed to the first substrate 10 (that is, at the lower side surface in FIG. 2) and to intersect the transparent electrodes 14 and an alignment layer 25 provided on the transparent electrodes 21. The transflective liquid crystal device further includes a polarizer 107 and a retardation film 108, which are provided for the opposite side of the first substrate 10 from the liquid crystal layer 50, and outside the polarizer 107, a fluorescent tube 119 and a light guide plate 118 which guides light emitted from the fluorescent tube 119 into a liquid crystal panel via the polarizer 107. The first substrate 10 and the second substrate 20 are bonded together at the periphery of the liquid crystal layer 50 with a sealing material 31, and the liquid crystal layer 50 is enclosed between the first substrate 10 and the second substrate 20 by the sealing material 31 or a plugging material 32. In addition, the transflective liquid crystal device has a polarizer 105, a first retardation film 106, and a second retardation film 116 provided at the opposite side of the second substrate 20 from the liquid crystal layer 50.

The first substrate 10 and the second substrate 20 are required to be transparent to visible light or to be at least translucent thereto and are formed of, for example, a glass substrate or a quartz substrate.

The transparent electrode 14 and the transparent electrode 21 are each formed of a transparent conductive thin-film such as an ITO film.

The alignment layers 15 and 25 are each formed of an organic thin-film, such as a polyimide thin-film, are formed by spin coating or flexographic printing, and are processed by predetermined orientation treatment, such as rubbing treatment.

The liquid crystal layer 50 is placed in a predetermined orientation state by the alignment layers 15 and 25 when an electric field is not applied between the transparent electrodes 14 and the transparent electrodes 21. The liquid crystal layer 50 is formed of one type of nematic liquid crystals or an STN (Super Twisted Nematic) liquid crystal that is a mixture of several types of nematic liquid crystals.

The sealing material 31 is an adhesive formed of, for example, a photocurable resin or a thermosetting resin.

The plugging material 32 is formed of a resin adhesive or the like to plug an injection hole provided in the sealing material 31 after vacuum injection of the liquid crystal is performed via the injection hole.

The light guide plate 118 has a transparent body formed of for example, an acrylic resin plate having an irregular surface or a printing layer to light scatter on the entire back side, and is formed so as to receive light from the fluorescent tube 119 which is a light source and to emit approximately uniform light from the upper surface shown in the figure.

In particular, in this embodiment, a selective-reflection color filter 141 that has a slit or an opening having a predetermined shape provided in each pixel and that selectively reflects light in a predetermined wavelength range, and a selective-transmission color filter 142 that selectively transmits light in a predetermined wavelength range are formed under the transparent electrodes 14 that are provided above the first substrate 10. In addition, between the selective-reflection color filter 141 and the selective-transmission color filter 142, a light-shielding film 143 provided with slits therein is formed.

According to an enlarged view shown in FIG. 3, the selective-reflection color filter 141, which is an example of the first color filter, includes in each pixel a selective-reflection layer 141R that reflects R light and transmits G light and B light; a selective-reflection layer 141G that reflects G light and transmits R light and B light; and a selective-reflection layer 141B that reflects B light and transmits R light and G light. These selective-reflection layers 141R, 141G, and 141B are formed of known cholesteric liquid crystal, holograms, dychroic mirrors, or the like. In addition, the selective-transmission color filter 142, which is an example of a second color filter, includes in each pixel a selective-transmission layer 142R that transmits R light and absorbs G light and B light; a selective-transmission layer 142G that transmits G light and absorbs R light and B light; and a selective-transmission layer 142B that transmits B light and absorbs R light and G light. These selective-transmission layers 142R, 142G, and 142B are formed of known resin materials that are colored by dyes or pigments.

The selective-reflection layers 141R, 141G, and 141B are provided with slits 141h or opening portions having a predetermined shape. These slits 141h are also continuously formed in the light-shielding film 143. In addition, these selective-transmission layers 142R, 142G, and 142B are provided at areas opposed to the slits 141h, and the other part of the selective-transmission color filter 142 is formed of a planarization film 142f.

Next, various particular examples of slits 141h or opening portions provided in the selective-reflection layers 141R, 141G, and 141B will be described with reference to FIGS. 4(a)–4(d).

As shown in FIG. 4(a), four rectangular slits may be provided at four corners in each pixel; as shown in FIG. 4(b), five rectangular slits may be provided side by side in the lateral direction in each pixel; as shown in FIG. 4(c), a number of circular openings (for example, openings 2 mm in diameter) may be dispersedly provided in each pixel; and as shown in FIG. 4(d), one relatively large rectangular slit may be provided in each pixel. These opening portions may be easily formed by a photolithographic step using a resist, a development step, and a stripping step. In addition to the plan shapes of the opening portions shown in FIGS. 4(a)–4(d), a square shape, a polygonal shape, an oval shape, or an irregular shape may also be used, and a slit extending through a plurality of pixels may also be used. In addition, when the selective-reflection layers 141R, 141G, and 141B are patterned, the opening portions may be simultaneously formed, and in the case described above, the number of manufacturing steps is not necessary to increase. In particular, where the slits are as those shown in FIGS. 4(a), (b), or (d), the width of the slit is preferably set to approximately 3 to 20 mm. When the slits are formed as described above, in both cases in which reflective display and transmissive display are performed, a bright and high contrast display can be created. Instead of forming the slits or the opening portions described above, for example, the selective-reflection layers 141R, 141G, and 141B may be separated from each other as viewed in plan from the direction perpendicular to the second substrate 20 so that light is allowed to pass through spacings formed by the neighboring selective-reflection layers 141R, 141G, and 141B.

The selective-transmission layers 142R, 142G, and 142B for individual RGB, which form the selective-transmission color filter 142, are arranged in a delta pattern, a stripe pattern, a mosaic pattern, a triangle pattern, or the like.

Even though not shown in FIGS. 1 and 2, for example, a light-shielding film that is formed of the same material as that of the light-shielding film 143 or is formed of a material different therefrom may be provided parallel to the inside of the sealing material 52 so as to be used as a frame to define the periphery of an image display area. Alternatively, this type of frame described above may be defined by the edges of a shading case in which a transflective liquid crystal device is received.

Next, operation of the transflective liquid crystal device of the first embodiment having the structure as described above will be described with reference to FIG. 3. For example, the transflective liquid crystal device of the first embodiment is a normally black mode driven by a passive matrix drive system.

Reflective display will first be described.

In the case mentioned above, in FIGS. 2 and 3, where external light L1 (see FIG. 3) enters from the polarizer 105 side (that is, the upper side in FIG. 2), after passing through the polarizer 105, the transparent second substrate 20, and the liquid crystal layer 50, the incident light is reflected from the selective-reflection color filter 141 provided above the first substrate 10, and again after passing through the liquid crystal layer 50, the second substrate 20, and the polarizer 105, the light is then emitted from the polarizer 105 side as reflection light L2 (see FIG. 3) which is colored by a predetermined color. In the steps described above, where image signals and scanning signals are supplied to the transparent electrodes 14 and the transparent electrodes 21 at predetermined timing from an external circuit, electric fields are sequentially applied to the liquid crystal layer 50 in each row, each column, or each pixel at which the transparent electrodes 14 and the transparent electrodes 21 intersect each other. Accordingly, by controlling the orientation state of the liquid crystal layer 50 in each pixel using this voltage application, the amount of light passing through the polarizer 105 is modulated, and hence, gray scale color display can be performed.

Next, transmissive display will be described.

In the case mentioned above, in FIGS. 2 and 3, where light-source light L3 (see FIG. 3) enters from the lower side of the first substrate 10 via the polarizer 107, the incident light is transmitted through the selective-transmission color filter 142 and the slits 141h, and after passing through the liquid crystal layer 50, the second substrate 20, and the polarizer 105, the incident light is then emitted from the polarizer 105 side as transmission light L4 which is colored by a predetermined color. In the steps described above, when image signals and scanning signals are supplied to the transparent electrodes 14 and the transparent electrodes 21 at predetermined timing from an external circuit, electric fields are sequentially applied to the liquid crystal layer 50 in each row, each column, or each pixel at which the transparent electrodes 14 and the transparent electrodes 21 intersect each other. Accordingly, by controlling the orientation state of the liquid crystal layer 50 in each pixel using this voltage application, the light-source light is modulated, and hence, gray scale display can be performed.

As a result, according to the first embodiment, where the transmissive display is performed, a color complementary to that of the reflective display is not displayed in each pixel, and where the device structure is formed so that color display having normal color tones can be performed by the selective-reflection color filter 141 in the case of the reflective display, color display having normal color tones can also be performed by the selective-transmission color filter 142 in the case of the transmissive display. In addition, where reflective display is performed using external light having limited light intensity, since the selective-reflection color filter 141 is used instead of a conventional selective-transmission color filter, bright reflective display can be performed.

(Second Embodiment)

Figure 5:
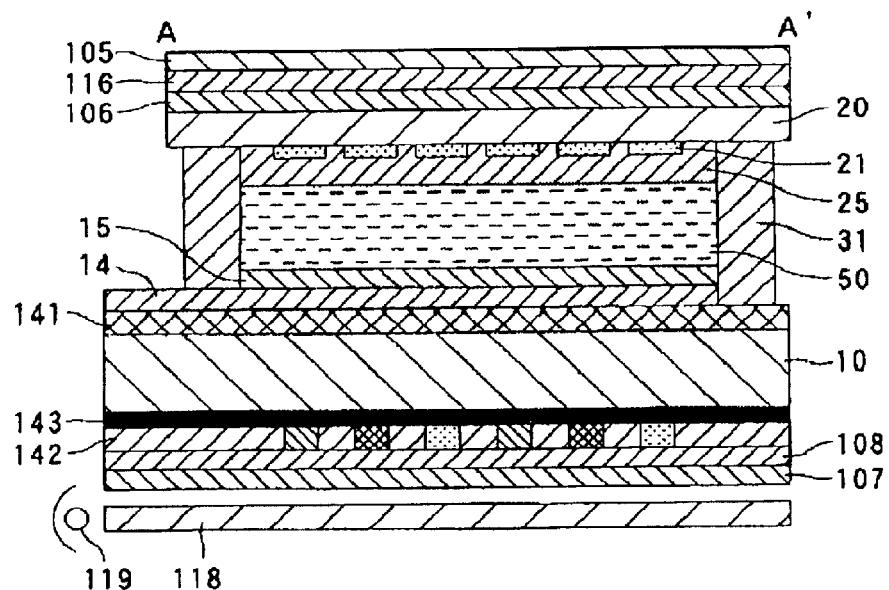
FIG. 5 is a cross-sectional view of a transflective liquid crystal device having a passive matrix drive system according to a second embodiment of the present invention.

Next, a second embodiment of the present invention will be described with reference to FIG. 5. FIG. 5 is a cross-sectional view showing the structure of the second embodiment, and the same reference labels as with the first embodiment shown in FIG. 2 designate the same constituent elements in FIG. 5, and descriptions thereof will be omitted.

As shown in FIG. 5, in the second embodiment in which the structure is different from that of the first embodiment, the selective-transmission color filter 142 and the light-shielding film 143 are provided at the opposite side of the first substrate 10 from the liquid crystal layer 50. The rest of the structure is equivalent to that of the first embodiment.

According to the second embodiment, by the selective-transmission color filter 142 provided at the opposite side of the first substrate 10 from the liquid crystal layer 50, and the selective-reflection color filter 141 provided on the first substrate 10 at the liquid crystal layer 50 side, transmissive display and reflective display can both be performed.

(Third Embodiment)

Figure 6:
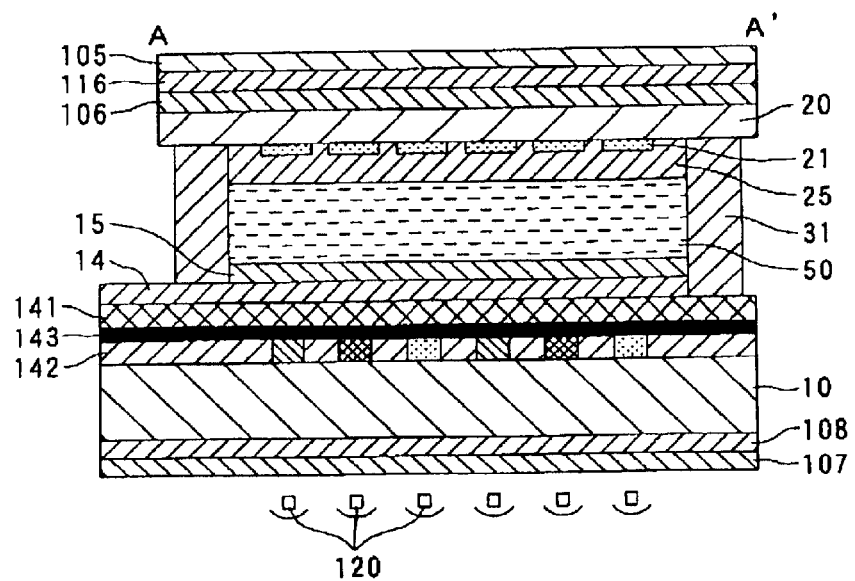
FIG. 6 is a cross-sectional view of a transflective liquid crystal device having a passive matrix drive system according to a third embodiment of the present invention.

Next, a third embodiment of the present invention will be described with reference to FIG. 6. FIG. 6 is a cross-sectional view showing the structure of the third embodiment, and the same reference labels as with the first embodiment shown in FIG. 2 designate the same constituent elements in FIG. 6, and descriptions thereof will be omitted.

As shown in FIG. 6, in the third embodiment in which the structure is different from that of the first embodiment, in place of the light guide plate 118 and the fluorescent tube 119, a plurality of point light sources 120 formed of an LED (light Emitting Diode), an El (Electro-Luminescence), or the like is dispersedly provided at positions opposed to the slits 141h of the selective-reflection color filter 141, that is, at positions opposed to the selective-transmission layers 142R, 142G, and 142B of the selective-transmission color filter 142. The rest of the structure is equivalent to that of the first embodiment.

According to the third embodiment, unnecessary light-source light, which is shaded by the light-shielding film 143, is not substantially emitted from the point light sources 120. As a result, the energy efficiency in the light source is increased, and hence, a brighter transmissive display can be created at the same power consumption.

(Fourth Embodiment)

Figure 7:
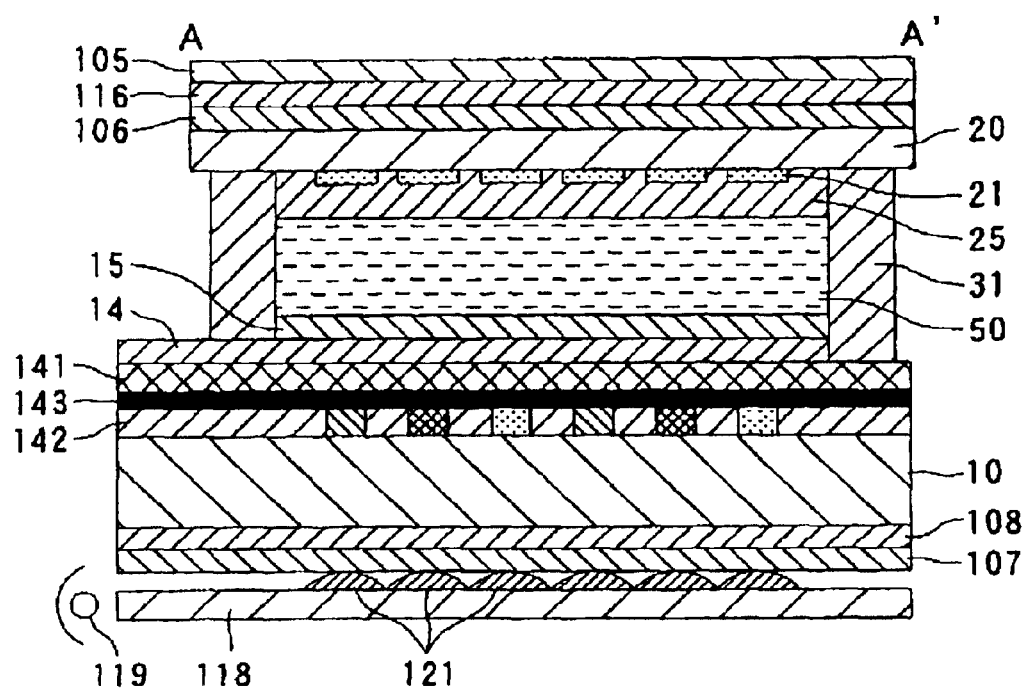
FIG. 7 is a cross-sectional view of a transflective liquid crystal device having a passive matrix drive system according to a fourth embodiment of the present invention.

Next, a fourth embodiment of the present invention will be described with reference to FIG. 7. FIG. 7 is a cross-sectional view showing the structure of the fourth embodiment, and the same reference labels as with the first embodiment shown in FIG. 2 designate the same constituent elements in FIG. 7, and descriptions thereof will be omitted.

As shown in FIG. 7, in the fourth embodiment, in addition to the structure of the first embodiment, a plurality of microlenses 121 are provided on the light guide plate 118 at positions opposed to the slits 141h of the selective-reflection color filter 141, that is, at positions opposed to the selective-transmission layers 142R, 142G, and 142B of the selective-transmission color filter 142. The rest of the structure is equivalent to that of the first embodiment.

According to the fourth embodiment, light-source light emitted from the light guide plate 118 is condensed by the microlenses 121, and hence, unnecessary light-source light that is blocked by the light-shielding film 143 can be reduced. As a result, the energy efficiency in the light source is increased, and hence, a brighter transmissive display can be created at the same power consumption.

(Fifth Embodiment)

Figure 8:
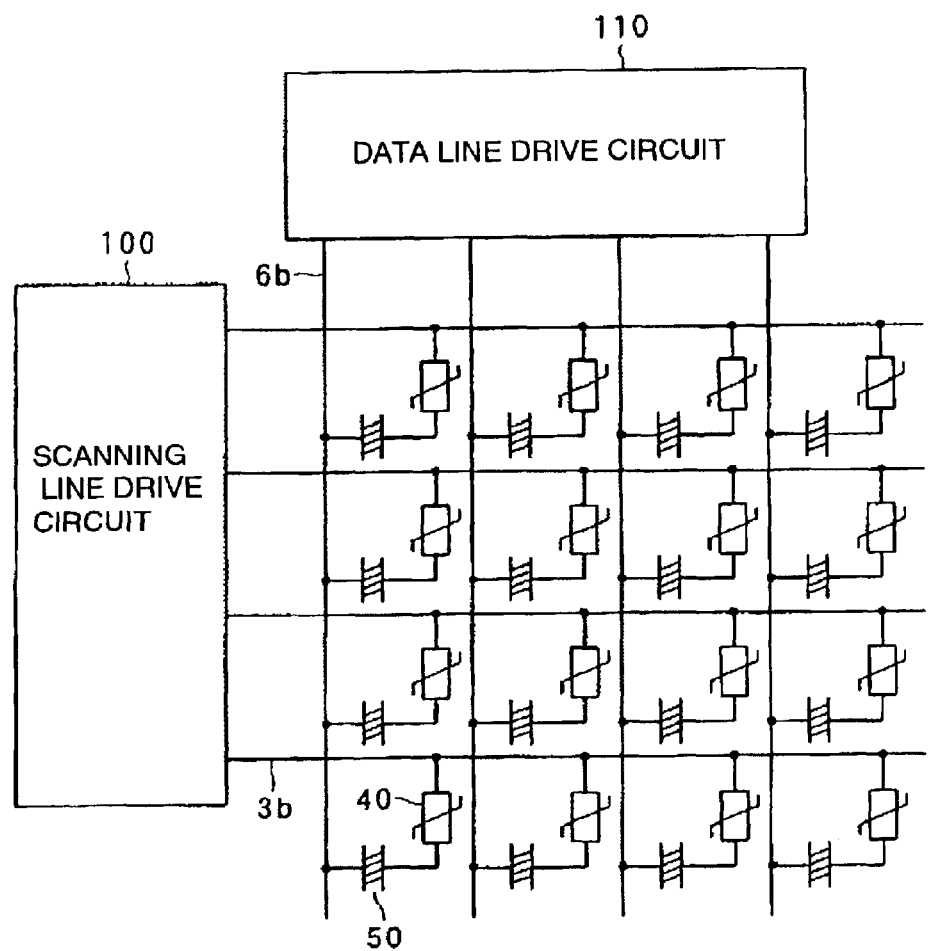
FIG. 8 is an equivalent circuit diagram showing liquid crystal elements and drive circuits of a transflective electro-optical device according to a fifth embodiment of the present invention.
Figure 9:
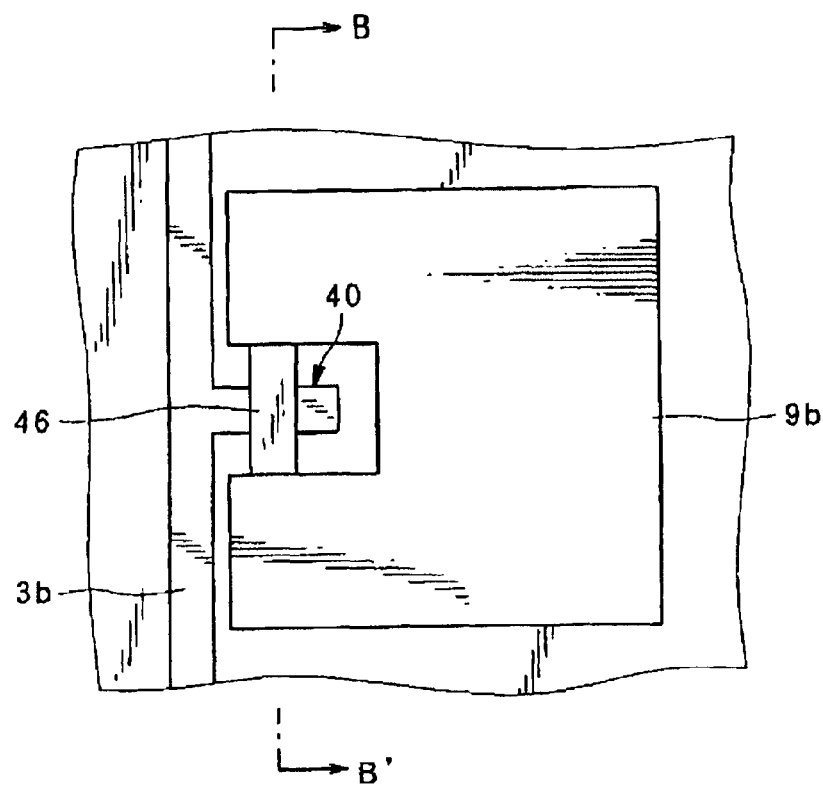
Figure 10:
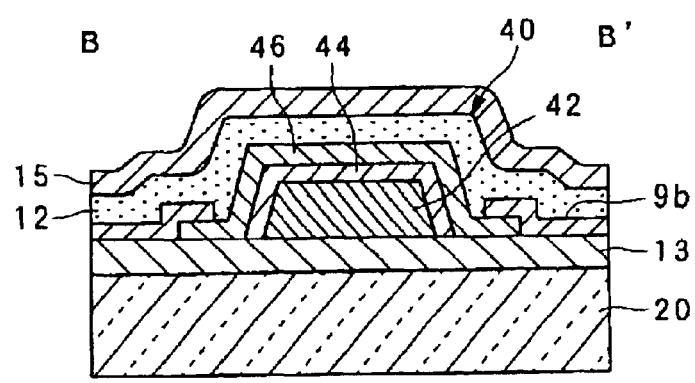
FIG. 10 is a cross-sectional view taken along plane B–B' in FIG. 9.
Figure 11:
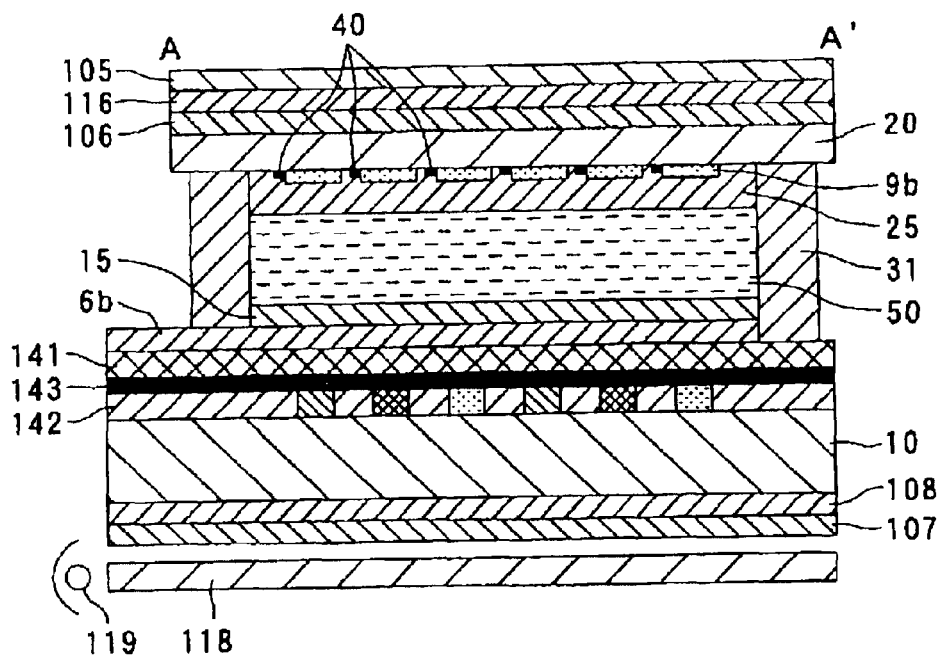
FIG. 11 is a schematic cross-sectional view showing the whole structure of the transflective electro-optical device according to the fifth embodiment of the present invention.

Next, a fifth embodiment of the present invention will be described with reference to FIGS. 8 to 11. In the fifth embodiment, the present invention is applied to a transflective electro-optical device having a TFD active matrix drive system. FIG. 8 is an equivalent circuit diagram showing both of liquid crystal elements and drive circuits incorporated in the transflective electro-optical device of the fifth embodiment; FIG. 9 is a schematic plan view showing one particular example of the TFD drive element shown in FIG. 8 together with a pixel electrode and the like; and FIG. 10 is a cross-sectional view taken along plane B–B' in FIG. 9. In addition, FIG. 11 is a schematic cross-sectional view showing the whole structure of the transflective electro-optical device according to the fifth embodiment. In FIG. 11, for the convenience of illustration in the figure, only six pixel electrodes are schematically shown in the figure. However, a number of pixel electrodes are provided in practice. In addition, in FIGS. 10 and 11, in order to recognize individual layers and individual members in these figures, the individual layers and the individual members are drawn in scales that are different from each other.

The structure and operation of a reflective liquid crystal device having a TFD active matrix drive system will first be described with reference to FIG. 8.

As shown in FIG. 8, in the liquid crystal device having the TFD active matrix drive system, a plurality of scanning lines 3b provided on the second substrate are connected to a scanning line drive circuit 100, and a plurality of data lines 6b provided on the first substrate are connected to a data line drive circuit 110. In the case described above, the scanning line drive circuit 100 and the data line drive circuit 110 may be formed on the second substrate or the first substrate, or may be formed of external IC's so as to be connected to the scanning lines 3b and the data lines 6b via predetermined lines.

In each of the pixel regions in a matrix, the scanning line 3b is connected to one terminal of a TFD drive element 40, and the data line 6b is connected to the other terminal of the TFD drive element 40 via the liquid crystal layer 50 and the pixel electrode.

Accordingly, where a scanning signal is supplied to one scanning line 3b connected to each pixel region, and a data signal is supplied to one data line 6b, the TFD drive element 40 in the corresponding pixel region is placed in an ON state, and a drive voltage is applied to the liquid crystal layer 50 provided between the pixel electrode and the data line 6b via the TFD drive element 40.

Referring to FIGS. 9 and 10, one particular example of the TFD drive element 40 that switches pixels as described above will be described.

As shown in FIGS. 9 and 10, the TFD drive element 40 is formed on a second insulation film 13, which functions as an underlying layer and is provided on the second substrate 20 forming a TFD array substrate, and has a TFD structure or an MIM (metal insulation metal) structure formed of a first metal film 42, an insulation film 44, and a second metal film 46 provided in that order from the second insulation film 13. The first metal film 42 of the TFD drive element 40 is connected to the scanning line 3b formed on the second substrate 20, and the second metal film 46 is connected to the pixel electrode 9b. In this structure described above, the data line 6a may be formed on the second substrate 20 in place of the scanning line 3b and connected to the pixel electrode 9b, and the scanning line 3b may be provided at the first substrate 10 side.

The second substrate 20 is an insulating and transparent substrate, such as a glass or a plastic, or is an opaque semiconductor substrate or the like. In this embodiment as described above, the second insulation film 13 functions as an underlying layer for the TFD drive element 40. However, an insulation film formed of tantalum oxide or the like, exclusively used as an underlying layer may be formed in addition to the second insulation film 13, or the underlying layer described above may not be provided as long as the surface condition of the second substrate has no problems. The first metal film 42 is a conductive metal thin-film formed of, for example, tantalum or an alloy thereof. The insulation film 44 is an oxide film formed by, for example, anodizing the surface of the first metal film 42 in a chemical conversion solution. The second metal film 46 is a conductive metal thin-film formed of, for example, chromium or an alloy thereof.

In addition, on the pixel electrode 9b, the TFD drive element 40, the scanning line 3b, and the like, which are opposed to the liquid crystal, a first insulation film 12 is provided, and the alignment layer 15 is provided thereon.

In addition to the TFD drive element described above, two-terminal type nonlinear element having bidirectional diode properties, such as a ZnO (zinc oxide) varistor, an MSI (Metal Semi-Insulator) drive element, or an RD (Ring Diode), may be applied to the transflective liquid crystal device of this embodiment.

As shown in FIG. 11, compared to the case of the first embodiment, the transflective electro-optical device of the fifth embodiment preferably has strip-shaped transparent data lines 6b on the first substrate 10 instead of the transparent electrodes 14 in a stripe pattern. In addition, on the second substrate 20, instead of transparent electrode 21 in a stripe pattern, transparent pixel electrodes 9b and TFD drive element 40 adjacent thereto are provided. At the second substrate 20 side, the scanning lines 3b described in FIGS. 8 to 10 are connected to the TFD drive elements 40. The rest of this structure is equivalent to that described in the first embodiment.

According to the fifth embodiment, at the first substrate 10 side, the selective-reflection color filter 141 is provided under the data lines 6b functioning as transparent electrodes, the selective-transmission color filter 142 is provided so as to be opposed to the slits provided in the selective-reflection color filter 141, and in areas between these filters except for the slits, the light-shielding film 143 is formed. Accordingly, the selective-reflection color filter 141 other than the slits reflects external light so that the external light is emitted from the second substrate 20 side, and hence, reflective display by the TFD active matrix drive can be performed. In addition, where the fluorescent tube 119 is turned on, the light-source light is emitted from the second substrate 20 side via the selective-transmission filter 142 and the slits of the selective-reflection color filter 141, and hence, transmission display by the TFD active matrix drive can be performed. In particular, since a voltage is applied to each pixel electrode 9b via the TFD drive element 40, crosstalk between the pixel electrodes 9b can be reduced, and as a result, higher-quality image display can be performed.

(Sixth Embodiment)

Figure 12:
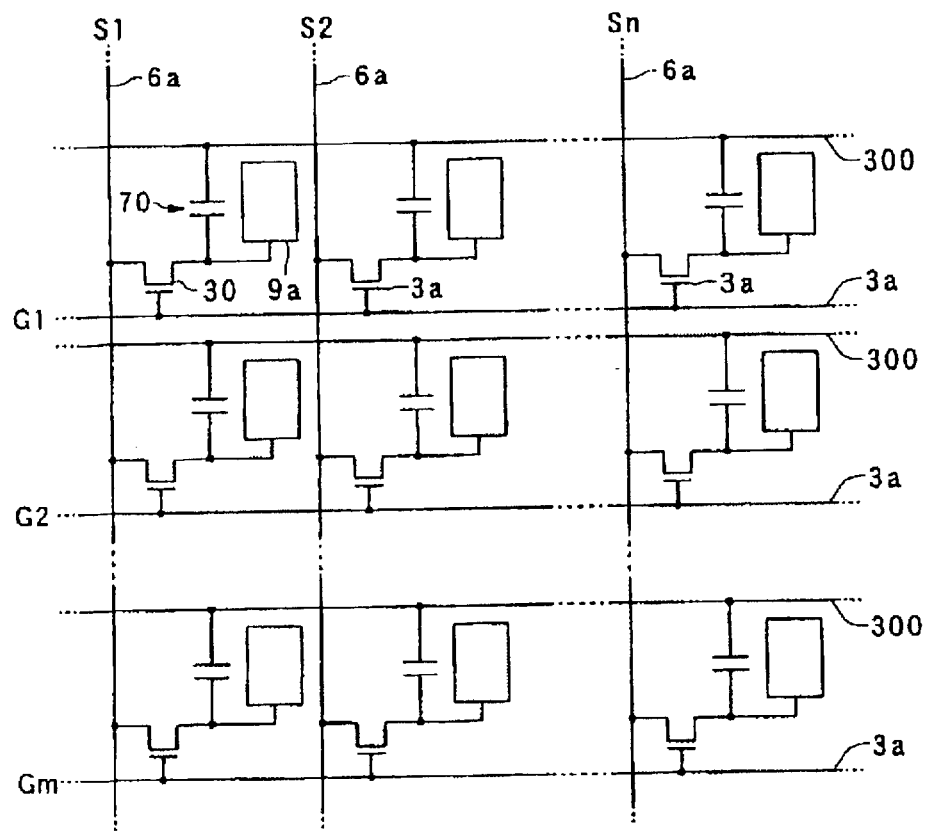
FIG. 12 is an equivalent circuit diagram of various elements, wires, and the like in a plurality of pixels in a matrix which forms an image display region of an electro-optical device according to a sixth embodiment of the present invention.
Figure 13:
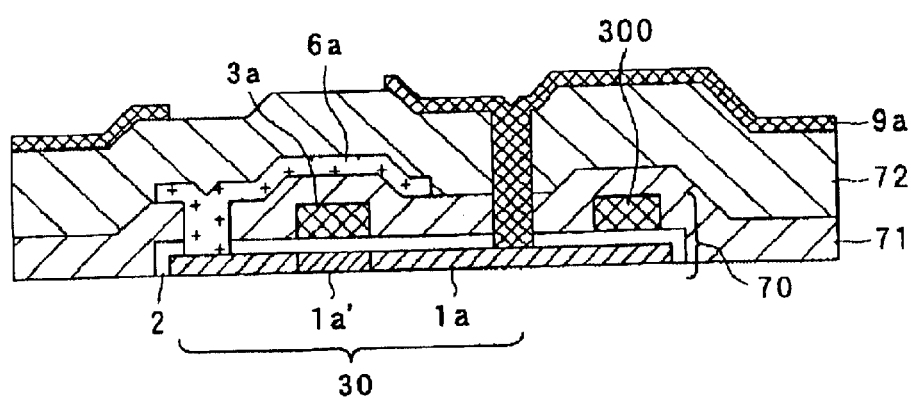
FIG. 13 is a schematic cross-sectional view showing the structure of a TFT for pixel switching according to the sixth embodiment.
Figure 14:
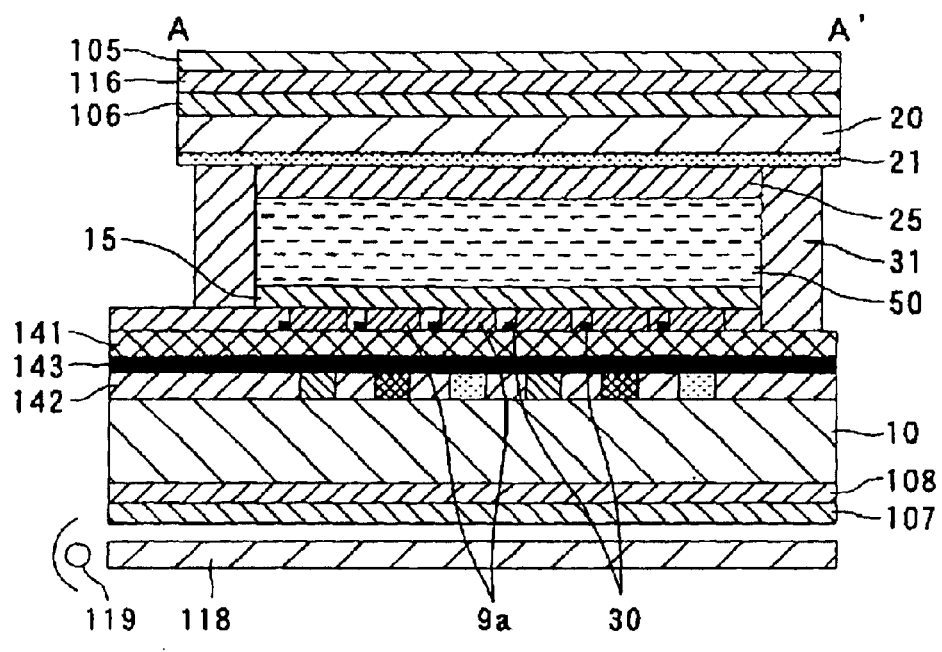
FIG. 14 is a schematic cross-sectional view showing the whole structure of a transflective electro-optical device according to the sixth embodiment.

Next, a sixth embodiment of the present invention will be described with reference to FIGS. 12 to 14. In the sixth embodiment, the present invention is applied to a transflective electro-optical device having a TFT active matrix drive system. FIG. 12 is an equivalent circuit diagram of various elements, wires, and the like in a matrix of a plurality of pixels constituting the image display region of the electro-optical device of the sixth embodiment, and FIG. 13 is schematic cross-sectional view showing the structure of the TFT for pixel switching. FIG. 14 is a schematic cross-sectional view showing the whole structure of the transflective electro-optical device of the sixth embodiment. In FIG. 12, for the convenience of illustration, only six pixel electrodes are schematically shown. However, a number of pixel electrodes are provided in practice, and in FIGS. 13 and 14, in order to recognize individual layers and individual members in the figure, the individual layers and the individual members are drawn in scales that are different from each other.

In FIG. 12, in each of the plurality of pixels in a matrix constituting the image display region of the electro-optical device according to this embodiment, a pixel electrode 9a and a TFT 30 that performs switching control of the pixel electrode 9a are provided, and a data line 6a to which image signals are input is electrically connected to the source of the TFT 30. Image signals S1, S2, . . . , Sn input to the data lines 6a may be sequentially input in that order to each line or may be input to each group formed of a plurality of neighboring data lines 6a. In addition, the scanning lines 3a are connected to the gates of the TFT's 30, and are formed so that scanning signals G1, G2, . . . , Gm are sequentially and pulse-wise input to the scanning lines 3a in that order. The pixel electrodes 9a are electrically connected to the drains of the TFT's 30, and where the switches of the TFT's 30 functioning as a switching element are closed for a predetermined period, image signals S1, S2, . . . , Sn supplied from the data line 6a are saved at a predetermined timing. The image signals S1, S2, . . . , Sn having a predetermined level input to the liquid crystal, which is one example of the electro-optical materials, via the pixel electrode 9a are retained between the pixel electrode 9a and a counter electrode (described later) formed on a counter substrate (described later) for a predetermined time. In accordance with changes in orientation and regularity of a molecular aggregate of liquid crystal depending on the level of an applied voltage, light is modulated, and hence, gray scale display can be performed. In a normally-white mode, the light transmittance of incident light is decreased in accordance with a voltage applied to each pixel, and in a normally-black mode, the light transmittance of incident light is increased in accordance with a voltage applied to each pixel. On the whole, light having a contrast in compliance with an image signal is emitted from the electro-optical device. In order to avoid leakage of the retained image signals, a storage capacitor 70 is provided parallel with a liquid crystal capacitor formed between the pixel electrode 9a and the counter electrode. The storage capacitor 70 includes a capacitor electrode at the fixed potential side formed of a part of a capacitive line 300 and a capacitor electrode at the pixel potential side connected to the drain of the TFT 30 and the pixel electrode 9a.

Next, one particular example of the TFT 30 for pixel switching shown in FIG. 12 is shown in FIG. 13.

As shown in FIG. 13, the TFT 30 includes a semiconductor layer 1a having a channel region 1a' and a gate electrode with a gate insulation film 2 provided therebetween, and the gate electrode is formed of a part of the scanning line 3a so as to be opposed to the channel region 1a'. In addition, the capacitive line 300 and a portion extending from the drain region of the semiconductor layer 1a are provided to be opposed to each other with the gate insulation film 2 provided therebetween, and hence, the storage capacitor 70 is formed. The data line 6a is connected to the source region of the semiconductor layer 1a via a contact hole provided in an interlayer insulation film 71. The transparent pixel electrode 9a formed of an ITO film or the like is connected to the drain region of the semiconductor layer 1a via a contact hole provided in an interlayer insulation film 72. Accordingly, where a scanning signal is supplied to the scanning line 3a, the TFT 30 is placed in a conduction state, an image signal supplied to the data line 6a can be saved in the pixel electrode 9a, and in addition, by the storage capacitor, the voltage saved in this pixel electrode 9a is retained.

The TFT 30 shown in FIG. 13 is an example, and various TFT's, such as a TFT having an LDD (Lightly Doped Drain) structure, a self-align type TFT, and a double-gate TFT, may be used as the TFT 30 shown in FIG. 12. In addition, various silicon films, such as a low-temperature polysilicon film, a high-temperature polysilicon film, and an amorphous silicon film, may be used for the semiconductor layer 1a.

As shown in FIG. 14, compared to the case of the first embodiment, the transflective electro-optical device of the sixth embodiment has the transparent pixel electrodes 9a forming an island-shaped pattern, each being provided in the corresponding pixel above the first substrate 10 instead of the transparent electrodes 14 in a stripe pattern, and the TFTs 30 are provided adjacent to the corresponding transparent pixel electrodes forming an island-shaped pattern, respectively. In addition, on the second substrate 20, instead of the transparent electrodes 21 in a stripe pattern, a counter electrode 21' is formed over the entire surface of the substrate. At the first substrate 10 side, the scanning lines 3b, data lines 6a, and capacitive lines 300, which are described in FIGS. 12 and 13, are connected to the TFT's 30. The rest of the structure is equivalent to that described in the first embodiment. Peripheral circuits, such as a scanning line drive circuit that drives the scanning lines 3a and data line drive circuit that drives data lines 6a, may be formed in the peripheral region on the first substrate 10, or external peripheral circuits may be formed.

According to the sixth embodiment, at the first substrate 10 side, the selective-reflection color filter 141 is provided under the transparent pixel electrodes 9a, the selective-transmission color filter 142 is provided at a position so as to be opposed to the slits provided in the selective-reflection color filter 141, and in areas between these filters other than the slits, the light-shielding film 143 is formed. Accordingly, the selective-reflection color filter 141 other than the slits reflects external light so as to emit the external light from the second substrate 20 side, and hence, reflective display can be performed by the TFT active matrix drive. In addition, where the fluorescent tube 119 is turned on, the light-source light is emitted from the second substrate 20 side via the selective-transmission filter 142 and the slits of the selective-reflection color filter 141, and hence, transmission display can be performed by the TFT active matrix drive. In particular, since a voltage is applied to each pixel electrode 9a via the TFT 30, crosstalk between the pixel electrodes 9a can be reduced, and as a result, higher-quality image display can be performed.

The selective-transmission layers 142R, 142G, and 142B forming the selective-transmission color filter 142 described in the first to the sixth embodiments may be formed by an inkjet method or may be formed by a flexographic printing method. If formed as described above, the selective-transmission layers 142R, 142G, and 142B are relatively easily formed at only the positions opposed to the slits 141h formed in the selective-reflection color filter 141.

In addition, in the first to the sixth embodiments described above, a color filter is not provided at the second substrate 20 side. However, in addition to the selective-reflection color filter 141 and the selective-transmission color filter 142 provided at the first substrate 10 side, a selective-transmission color filter may be provided at the second substrate 20 side.

(Seventh Embodiment)

Figure 15:
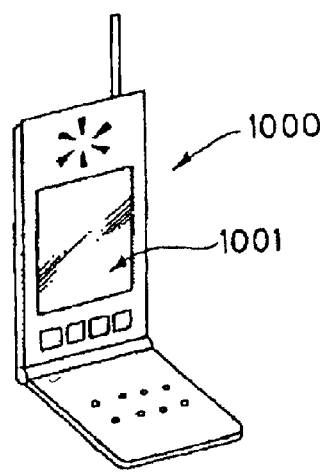
FIGS. 15(a)–15(c) are perspective views showing various electronic apparatuses according to a seventh embodiment of the present invention.
Figure 15:
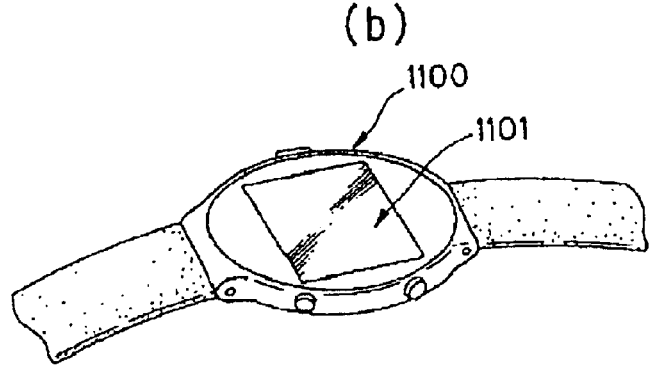
Figure 15:
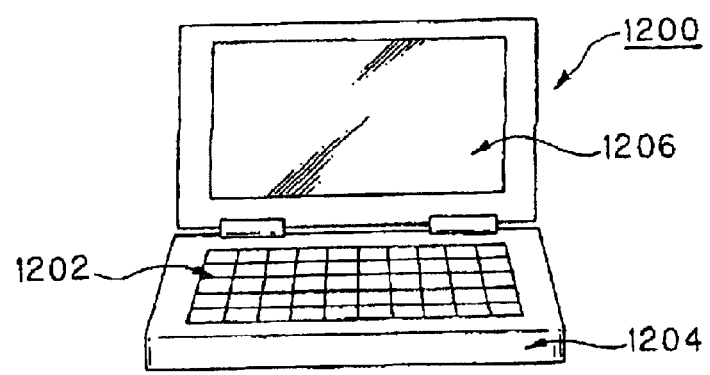

Next, a seventh embodiment of the present invention will be described with reference to FIGS. 15(a)–15(c). In the seventh embodiment, various electronic apparatuses that are provided with the transflective electro-optical device according to one of the first to the sixth embodiments of the present invention will be described.

Where the transflective electro-optical device according to one of the first to the sixth embodiments is applied to, for example, a display portion 1001 of a mobile phone 1000 as shown in FIG. 15(*a*), an energy conservation mobile phone, which can interchangeably perform bright, color reflective display and color transmissive display, can be formed.

In addition, when the transflective electro-optical device described above is applied to a display portion 1101 of a wristwatch 1100 as shown in FIG. 15(*b*), an energy conservation wristwatch, which can interchangeably perform bright, color reflective display and color transmissive display, can be formed.

Furthermore, in a personal computer (or information terminal) 1200 as shown in FIG. 15(*c*), where the transflective electro-optical device described above is applied to a display screen 1206 provided inside a cover pivotably provided for a main body 1204 having a keyboard 1202 therein, an energy conservation personal computer, which can interchangeably perform bright, color reflective display and color transmissive display, can be formed.

In addition to the electronic apparatuses shown in FIG. 15, the transflective electro-optical devices of the first to sixth embodiments may be applied to an electronic apparatus, such as a liquid crystal television, a viewfinder type of direct viewing video tape recorder, a car navigation apparatus, an electronic notebook, an electronic calculator, a word processor, an engineering workstation (EWS), a television phone, a POS terminal, or an apparatus provided with a touch panel.

The present invention is not limited to the embodiments described above, modification may be optionally made without departing from the scope and the spirit of the present invention described in the claims and the specification, and it is apparent that electro-optical devices and electronic apparatuses, modified as described above, are also included in the technical scope of the present invention.

What is claimed is:

1. A transflective electro-optical device, comprising:
   a pair of substrates;
   an electro-optical material provided between the pair of substrates;
   display electrodes provided on at least one of the pair of substrates at an electro-optical material side;
   a first color filter provided on one substrate of the pair of substrates at the electro-optical material side, the first color filter having a selective-reflection region in each pixel that selectively reflects external light that is in a predetermined wavelength range, and a light-transmission region in each pixel that transmits external light that is in and outside of the predetermined wavelength range, the other substrate of the pair of substrates that is opposed to the first color filter, with the electro-optical material provided therebetween, being a transparent substrate;
   a light-shielding film provided at an opposite side of the first color filter from the electro-optical material so as to be opposed to the selective-reflection regions;
   an internal light source provided at the opposite side of the second color filter from the electro-optical material; and
   a second color filter provided at the opposite side of the first color filter from the electro-optical material so as to be opposed to the light-transmission regions, the second color filter having a selective-transmission region in each pixel that selectively transmits light from the internal light source in the predetermined wavelength range.

2. The transflective electro-optical device according to claim 1, the first color filter including a selective-reflection layer provided in the selective reflection-region in each pixel, and
   the selective-reflection layer not being provided in a part of the light transmission region.

3. The transflective electro-optical device according to claim 2, the selective-reflection layer being provided with at least one of an opening and a slit at a position corresponding to the light transmission region.

4. The transflective electro-optical device according to claim 2, neighboring selective-reflection layers forming spacings therebetween, and the spacings being used as the light-transmission regions.

5. The transflective electro-optical device according to claim 1, the display electrodes including:
   first transparent electrodes provided in a stripe pattern on the first color filter at the electro-optical material side; and
   second transparent electrodes provided in a stripe pattern to be opposed to the first transparent electrodes, with the electro-optical material interposed therebetween, and to intersect the first transparent electrodes.

6. The transflective electro-optical device according to claim 1, the display electrodes including:
   first transparent electrodes provided on the first color filter at the electro-optical material side and which are each provided in each pixel, forming an island-shaped pattern; and
   a second transparent electrode opposed to the first transparent electrodes with the electro-optical material interposed therebetween.

7. The transflective electro-optical device according to claim 6, further including a switching element provided in each pixel and connected to the first transparent electrode.

8. The transflective electro-optical device according to claim 1, the display electrodes including:
   first transparent electrodes opposed to the first color filter with the electro-optical material interposed therebetween and which are each provided in each pixel, forming an island-shaped pattern; and
   a second transparent electrode opposed to the first transparent electrodes with the electro-optical material interposed therebetween.

9. The transflective electro-optical device according to claim 8, further including a switching element provided in each pixel and connected to the first transparent electrode.

10. The transflective electro-optical device according to claim 1, the second color filter being provided on said one substrate of the pair of substrates at the electro-optical material side.

11. The transflective electro-optical device according to claim 1, the second color filter being provided at the opposite side of said one substrate of the pair of substrates from the electro-optical material.

12. The transflective electro-optical device according to claim 1, the light-source being provided at the opposite side of the second color filter from the electro-optical material, and including a light guide plate opposed to the second color filter and a light source which emits light into the light guide plate.

13. The transflective electro-optical device according to claim 1, the light-source being provided at the opposite side of the second color filter from the electro-optical material, and including a plurality of point light sources opposed to the associated light transmission regions with the second color filter interposed therebetween.

14. The transflective electro-optical device according to claim 1, further including a plurality of microlenses provided at the opposite side of the first color filter from the electro-optical material so as to be opposed to the associated light transmission regions.

15. The transflective electro-optical device according to claim 1, the light-shielding film being provided between the first color filter and the second color filter.

16. An electronic apparatus, comprising:

the transflective electro-optical device according to claim 1.

17. A transflective electro-optical device, comprising:

a first substrate;

a second substrate that is transparent;

an electro-optical material disposed between the first substrate and the second substrate;

a color filter layer that is disposed at an electro-optical material facing side of the first substrate and that opposes the second substrate with the electro-optical material provided therebetween, the color filter layer having selective-reflection sections that selectively reflect light in a predetermined wavelength range and at least one of openings and slits that transmit light in the predetermined wavelength range and outside the predetermined wavelength range, the at least one of the openings and the slits being disposed between adjacent selective reflection sections;

a light-source provided at an opposite side of the color filter than the electro-optical material;

a color filter disposed at the opposite side of the color filter layer than the electro-optical material at the at least one of the openings and the slits of the color filter layer, the color filter selectively transmitting light in the predetermined wavelength range; and a light-shielding film disposed at the opposite side of the color filter layer than the electro-optical material at positions in opposition to the selective-reflection sections, the light-shielding film being open at the at least one of the openings and the slits.

* * * * *